(12) United States Patent
Zuo et al.

(10) Patent No.: US 8,648,691 B2
(45) Date of Patent: Feb. 11, 2014

(54) ELECTRONIC DEVICE AND CASING COLOR CHANGING METHOD THEREOF

(75) Inventors: Ziqiang Zuo, Shenzhen (CN); Shuqi Wang, Shenzhen (CN); Lingling Yao, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 61 days.

(21) Appl. No.: 13/259,573

(22) PCT Filed: Jul. 7, 2009

(86) PCT No.: PCT/CN2009/072674
§ 371 (c)(1),
(2), (4) Date: Nov. 7, 2011

(87) PCT Pub. No.: WO2010/127516
PCT Pub. Date: Nov. 11, 2010

(65) Prior Publication Data
US 2012/0044045 A1    Feb. 23, 2012

(30) Foreign Application Priority Data
May 8, 2009    (CN) .......................... 2009 1 0138245

(51) Int. Cl.
*G02F 1/15*    (2006.01)
*G05B 19/02*    (2006.01)

(52) U.S. Cl.
USPC .................. 340/4.31; 340/7.51; 340/7.55

(58) Field of Classification Search
CPC ............ G02F 1/15; G02F 1/153; G05B 19/02
USPC ............ 340/4.31, 7.51, 7.55; 455/566, 575.1, 455/90.3; 315/131, 132, 133; 362/183; 359/265, 267
See application file for complete search history.

(56) References Cited

U.S. PATENT DOCUMENTS 5,793,304 A * 8/1998 Sone ........................... 340/7.56
6,466,299 B1 * 10/2002 Lehtiniemi et al. ........... 349/199
(Continued)

FOREIGN PATENT DOCUMENTS

CN    2737119    10/2005
CN    101030161    9/2007
(Continued)

OTHER PUBLICATIONS

International Search Report for PCT/CN2009/072674, mailed Feb. 25, 2010, 5 pages.
(Continued)

*Primary Examiner* — Nam V Nguyen
(74) *Attorney, Agent, or Firm* — Vincent K. Gustafson; Jenkins, Wilson, Taylor & Hunt, P.A.

(57) ABSTRACT

An electronic device and a method for changing housing colors thereof are provided. This electronic device comprises: a power supply, a display screen, a housing (7), a user operation interface (1), a master controller (3), and a control circuit (5), wherein the housing (7) is configured to have multiple independent color-variable units, and each color-variable unit, which is connected to the power supply, is made of electrochromic materials with capacity of memory respectively; the user operation interface (1) is configured to receive an instruction inputted by a user for selecting a housing pattern; the master controller (3), which is connected to the user operation interface, is configured to convert the selected housing pattern into a first control signaling, and then to output the first control signaling; and the control circuit (5), which is connected to the master controller (3), is configured to receive the first control signaling, and to convert the first control signaling into different voltage signals and to control each color-variable unit of the housing (7) to change the color. By adopting this electronic device and the method for changing housing colors thereof, the housing patterns of electronic devices can be changed by following users' demands, which improves users' experience.

13 Claims, 5 Drawing Sheets

(56) References Cited

U.S. PATENT DOCUMENTS

| | | | |
|---|---|---|---|
| 6,608,996 B1* | 8/2003 | Laurikka et al. | 455/90.3 |
| 6,897,787 B2* | 5/2005 | Colorado et al. | 340/815.4 |
| 7,038,398 B1* | 5/2006 | Lys et al. | 315/291 |
| 7,142,190 B2* | 11/2006 | Martinez | 345/106 |
| 7,443,566 B2* | 10/2008 | Lerenius et al. | 359/265 |
| 7,518,776 B2* | 4/2009 | Chen | 359/265 |
| 7,766,517 B2* | 8/2010 | Kerr et al. | 362/362 |
| 2002/0008696 A1* | 1/2002 | Wagner | 345/204 |
| 2005/0052349 A1* | 3/2005 | Kuczynski et al. | 345/49 |
| 2006/0052063 A1* | 3/2006 | Lohr | 455/90.3 |
| 2008/0266846 A1* | 10/2008 | Cheng et al. | 362/183 |

FOREIGN PATENT DOCUMENTS

| | | |
|---|---|---|
| CN | 101131799 A | 2/2008 |
| CN | 101360403 A | 2/2009 |
| CN | 101577747 | 11/2009 |
| EP | 1079584 A2 | 2/2001 |
| GB | 2402750 A | 12/2004 |
| WO | WO 2007/089819 A1 | 8/2007 |

OTHER PUBLICATIONS

Extended European Search Report corresponding to European Patent Application No. 09844268.4 dated Sep. 6, 2012.

* cited by examiner

ELECTRONIC DEVICE AND CASING COLOR CHANGING METHOD THEREOF

CROSS-REFERENCE TO RELATED APPLICATIONS

This application is the national phase of PCT application PCT/CN2009/072674 having an international filing date of 7 Jul. 2009, which claims benefit of Chinese application No. 200910138245.X filed on 8 May 2009. The contents of the above patent applications are incorporated by reference herein in their entirety.

FIELD OF THE INVENTION

The present invention relates to electronic devices, and in particular to an electronic device with changeable housing patterns and a method for changing housing colors thereof.

BACKGROUND OF THE INVENTION

Housings of electronic devices (i.e., housings of mobile phones) have various functions, such as dust prevention, anti-pressure, and anti-electronic interference. In addition, these housings can also provide required appearance for the electronic devices. In the situation that the performance and functions of homogeneous products are similar, the appearance of products becomes a main factor which affects the consumers, while patterns (including colors) of the housings are the main aspect of the appearance.

However, current housing patterns generally cannot be changed after they leave factories. In order to adapt to the requirements of appearance change of products from the consumers, a general method is to manufacture housings with different patterns to facilitate users to alter in the prior art.

In addition, a housing, the color of which can be changed passively according to temperature or lighting, is provided in the prior art. This housing can only change its color passively but cannot change its pattern, while the color of the housing cannot be changed freely according to users' demands yet. Thus it reduces users' experience of this housing. Besides, the housing pattern and the pattern on screen background cannot be combined together as a whole in this situation, then affecting the aesthetic of the appearance of electronic products.

SUMMARY OF THE INVENTION

In view of the problem that the housing pattern (including color) of an electronic device cannot be changed according to users' demands in the prior art, the present invention is proposed. Thus the main object of the present invention is to provide an electronic device and a method for changing housing colors thereof, so as to solve at least one of the above-mentioned problems.

In order to achieve the above objects, an electronic device is provided according to one aspect of the present invention.

The electronic device according to the present invention comprises: a power supply, a display screen, a housing, an user operation interface, a master controller, and a control circuit, wherein the housing is configured to have multiple independent color-variable units, and each color-variable unit, which is connected to the power supply, is made of electrochromic materials with capacity of memory respectively; the user operation interface is configured to receive an instruction inputted by a user for selecting a housing pattern; the master controller, which is connected to the user operation interface, is configured to convert the selected housing pattern into a first control signaling, and then to output the first control signaling; and the control circuit, which is connected to the master controller, is configured to receive the first control signaling, and to convert the first control signaling into different voltage signals to control the each color-variable unit of the housing to change the color.

Preferably, the control circuit is connected to the master controller through a serial interface.

Preferably, the above control circuit comprises: a circuit for interface and decoding, configured to analyze the first control signaling from the master controller and to obtain an address and corresponding color information of the each color-variable unit; a chip selection decoder, configured to output the color information of the each color-variable unit according to the address of the each color-variable unit; and a decoder, which is connected to the each color-variable unit correspondingly, configured to decode the color information from the chip selection decoder and to convert the color information into the voltage signals, then to control an input voltage of the connected each color-variable unit according to the voltage signals in order that the connected each color-variable unit displays a color corresponding to the color information.

Preferably, the above electronic device further comprises: a timer, configured to control the master controller to output the first control signaling periodically according to a preset time.

Preferably, the user operation interface is further configured to instruct the display screen to display a screen pattern according to the instruction inputted by the user, wherein the housing pattern and the screen pattern are independent of each other, or are combined as a complete pattern; and the master controller is further configured to separate the screen pattern from the housing pattern, to convert the screen pattern into a second control signaling, and then to output the second control signaling; and the electronic device further comprises: a screen controlling circuit, which is connected to the master controller, configured to receive the second control signaling, and then to control the display screen to display the screen pattern according to the second control signaling.

Preferably, the above electronic device further comprises: a low dropout linear regulator, which is connected between the power supply and the each color-variable unit, configured to input multiple voltages into the each color-variable unit.

Preferably, the each color-variable unit of the housing is made of at least two types of electrochromic materials.

In order to achieve the above object, a method for changing the housing colors of an electronic device is provided according to another aspect of the present invention, wherein the housing of this electronic device has multiple independent color-variable units, and each color-variable unit is made of electrochromic materials with capacity of memory respectively.

The method for changing housing colors of the electronic device according to the present invention comprises: the electronic device receiving an instruction on a housing pattern selected by a user and converting the housing pattern into a control signaling; and the electronic device converting the control signaling into different voltage signals, and driving the each independent color-variable unit of the housing to change the color.

Preferably, after driving the each independent color-variable unit of the housing to change the color, the above method further comprises: setting and starting a timer, and then when the timer arrives a preset duration, driving the each independent color-variable unit of the housing to change the color again according to the voltage signals.

Preferably, the above method further comprises: the electronic device receiving the pattern entered by the user through an interface with the electronic device and storing the pattern to provide users to select.

By the above-mentioned at least one solution of the present invention, the housing of the electronic device consists of color-variable units made of electrochromic materials with capacity of memory, can change its color by the control circuit controlling each color-variable unit. Thereby the housing pattern of the electronic device can be changed according to users' demands, and improves users' experience.

Other features and advantages of the present invention will be described in the following specification, and partly become obvious from the specification, or be understood by implementing the present invention. The objects and other advantages of the present invention can be realized and achieved through the structures specially indicated in the specification, claims and drawings.

BRIEF DESCRIPTION OF THE DRAWINGS

The drawings herein are used to provide a further understanding of the present invention and form a part of the specification, and are used to explain the present invention together with the embodiments of the present invention without limiting the scope of the present invention. In the drawings.

DETAILED DESCRIPTION OF EMBODIMENTS

Functional Overview

Considering the problem in the prior art that patterns on housings of electronic devices can only be changed passively, the embodiments of the present invention provide an improved electronic device and a method for changing housing colors thereof. In the embodiments of the present invention, the housing of the electronic device comprises multiple independent color-variable units, wherein each color-variable unit is made of electrochromic materials with capacity of memory, and the input voltages to each color-variable unit can be controlled by a control circuit. Thus each color-variable unit can display diversity of colors corresponding to its different input voltages, and the housing of this electronic device can display the housing pattern selected by users.

In the embodiments of the present invention, electrochromism is a special phenomenon that an electrochromic material generates reversible changes between a colored state with low-transmittance and a bleached state with high-transmittance by injecting or extracting charges (i.e., ions or electrons) under alternate high and low or positive and negative external electric fields. While the reversible changes are presented as the reversible changes of color and transparency in appearance performance. In order to change the color of the electrochromic material, generally −2V-+2V voltage needs to be provided. Therefore it can be realized on a portable electronic device with low working voltage. Furthermore, the electrochromic material can display relatively more colors. For example, the electrochromic material with phthalocyanine can generate color systems including blue, green, yellow, red and the like. Thus a housing made of such an electrochromic material can generate more patterns relatively.

In addition, in order to achieve relatively complicated patterns rather than simple change of whole color, the whole housing is segmented into some smaller color-variable units in the embodiments of the present invention, and the color of each color-variable unit can be controlled independently. By changing the color of each color-variable unit, the pattern of the whole housing can be changed macroscopically.

It should be noted that the embodiments of the present invention and the features in the embodiments can be combined with each other if there is no conflict.

A detailed description is given to the preferred embodiments of the invention with reference to the accompanying drawings. The preferred embodiments of the present invention are described for the purpose of illustration, not for limiting the present invention.

An electronic device is first provided according to the embodiments of the present invention.

Figure 1:
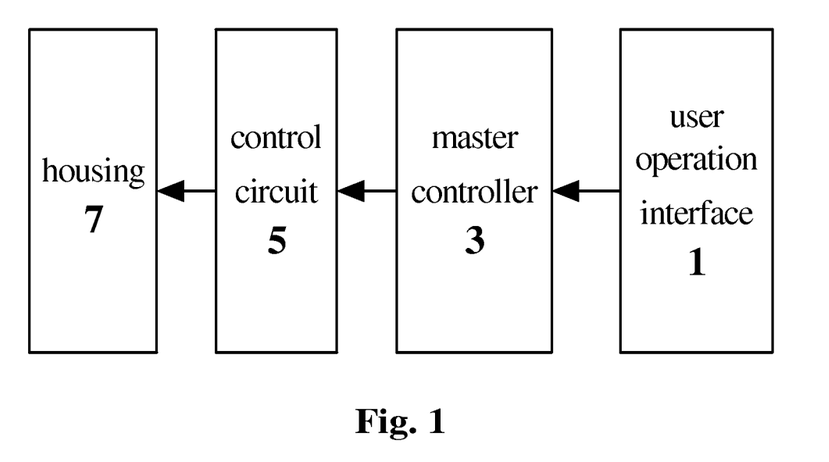
FIG. 1 is a schematic diagram of the structure of an electronic device according to the embodiments of the present invention.

FIG. 1 is a schematic diagram of the structure of an electronic device according to the embodiments of the present invention, and as shown in FIG. 1, the electronic device according to the embodiments of the present invention mainly comprises: a user operation interface 1, a master controller 3, a control circuit 5, and a housing 7. In addition, this electronic device further comprises: a power supply and a display screen. Wherein the housing 7 has multiple independent color-variable units, and each color-variable unit, which is connected to the power supply, is made of electrochromic materials with capacity of memory respectively; the user operation interface 1 is configured to receive an instruction entered by a user to select a housing pattern; the master controller 3, which is connected to the user operation interface 1, is configured to convert the selected housing pattern into a first control signaling and to output the first control signaling; and the control circuit 5, which is connected to the master controller, is configured to receive the first control signaling from the master controller 3, and to convert the first control signaling into different voltage signals to control the color changes of each color-variable unit of the housing 7.

During practical implementation, users may enter into a housing pattern setting interface through a User Interface (UI). On this setting interface, various patterns provided by the mobile phone can be selected by users, and these patterns are designed based on integrating the housing and the screen as a whole, so that it seems to be uniform. Users may also download patterns which are appropriate for mobile phones owned by themselves from the network through USB wires or from the operators or other websites through wireless data services. Moreover, users can also configure the patterns by themselves, which is carried out by the electronic device itself, or by being downloaded to the electronic device after performed by additional software on a computer. Whether it is implemented on the electronic device or on the computer, the patterns can be all configured through the setting interface according to uses' preference. Furthermore, the setting interface is similar to a drawing panel, on which users can select the color and thickness of the lines, can also enter words, and can also segment the housing into some smaller function units, such as frame, keyboard part, back shell, call key and reject key. Then a self-defined theme can be achieved by selecting the pattern or color of these keys, and the configuration self-defined by users will be stored into the mobile phone as a new theme for selection to use.

In the embodiments of the present invention, in order to save bus resources, the control circuit 5 and the master controller 3 can communicate with each other through a serial interface (i.e., an IIC interface).

Figure 2:
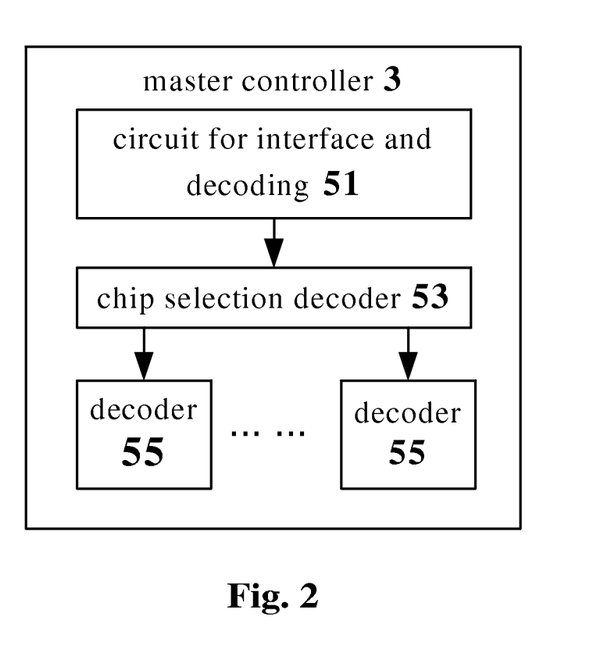
FIG. 2 is a schematic diagram of the structure of a control circuit according to the embodiments of the present invention.

During practical implementation, the master controller 3 converts patterns of the housing into corresponding control instructions, and sends the instructions to the control circuit 5. The control circuit 5 converts the instructions into different voltage signals, so as to drive each independent color-variable unit of the housing 7. In particular, as shown in FIG. 2, the control circuit 5 may further comprise: a circuit for interface and decoding 51, a chip selection decoder 53, and decoders 55, in which the circuit for interface and decoding 51 is configured to parse the first control signaling from the master controller 3 and to obtain the address and corresponding color information of each color-variable unit. When analyzing the patterns of the housing, the master controller 3 determines the colors displayed in each color-variable unit, and outputs the correlation between the address of each color-variable unit and the color displayed wherefrom to the control circuit 5 as the first control signaling; the chip selection decoder 53 is configured to output the color information of each color-variable unit according to the address of each color-variable unit, and in particular, the chip selection decoder 53 outputs the color information of each color-variable unit to the decoders 55 connected to the color-variable units according to the address of each color-variable unit; and the decoders, which are connected to each color-variable unit respectively, are configured to decode the color information inputted by the chip selection decoder 53, to convert this color information into voltage signals, and to control the input voltages of the color-variable units connected with the decoders according to the voltage signals so as to enable the color-variable units to display colors corresponding to the inputted color information.

Figure 3:
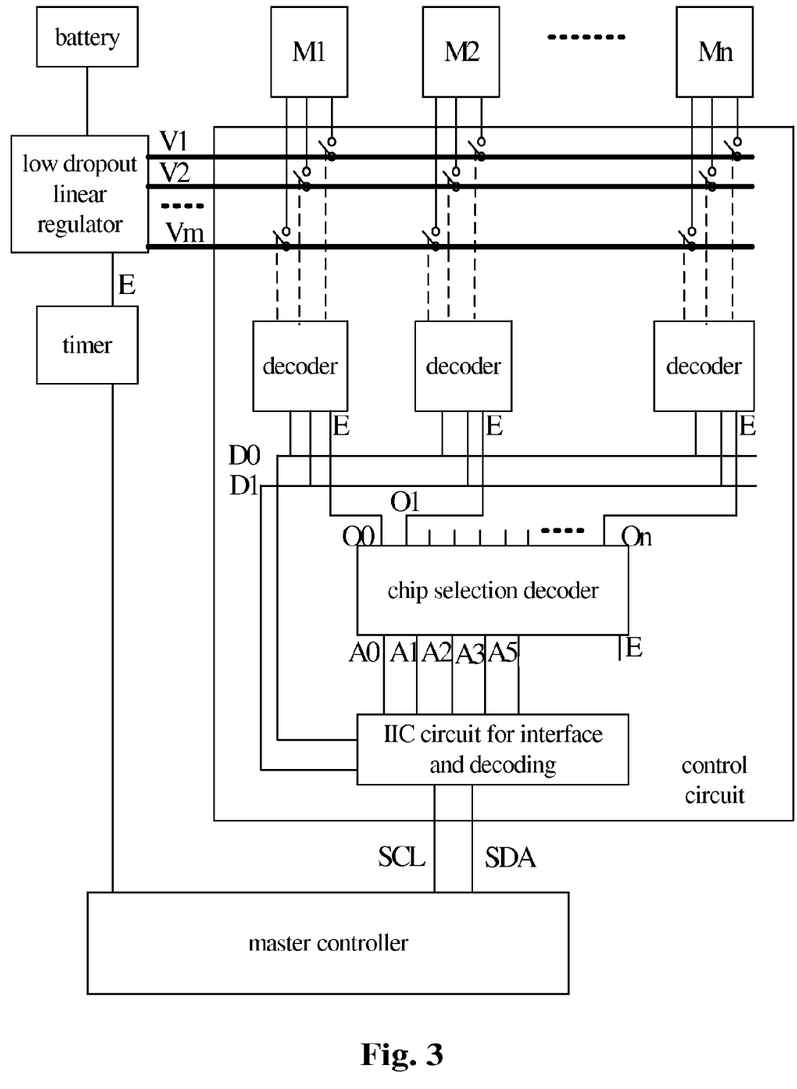
FIG. 3 is a schematic diagram of the practical implementation of the control circuit according to the embodiments of the present invention.

In particular, the control circuit can be implemented by the structure as shown in FIG. 3, and as shown in FIG. 3, the control circuit 5 and the master controller 3 communicate with each other through a serial interface (i.e., an IIC interface). A circuit for IIC interface (namely, circuit for IIC interface and decoding 51) in the control circuit 5 decodes the address and data from the IIC bus and sends the decoded results to internal data and address buses, and the chip selection decoder transmits the corresponding data to a corresponding decoder, wherein the data having been decoded by the decoder can control each color-variable unit. Moreover, the control circuit 5 may be implemented by CPLD or FPGA.

Figure 4:
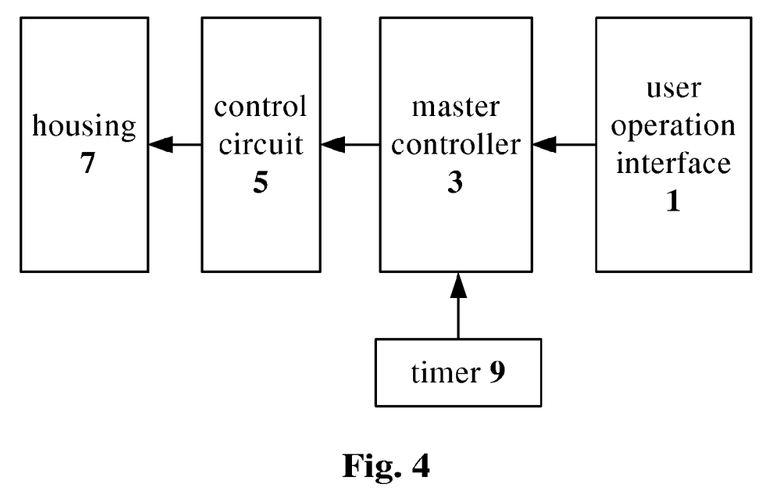
FIG. 4 is a schematic diagram of the structure of an electronic device according to a preferred embodiment of the present invention.

Furthermore, since current electrochromic materials cannot keep the color long enough after power-down, as shown in FIG. 4, the electronic device according to the embodiments of the present invention may further comprise: a timer 9 configured to periodically enable the master controller 3 to output the above first signaling according to a preset time, so as to provide power for each color-variable unit to refresh the color; or the timer 9 is configured to enable the power supply periodically according to a preset time, in order that the power supply provides power for each color-variable unit to refresh the color.

Figure 5:
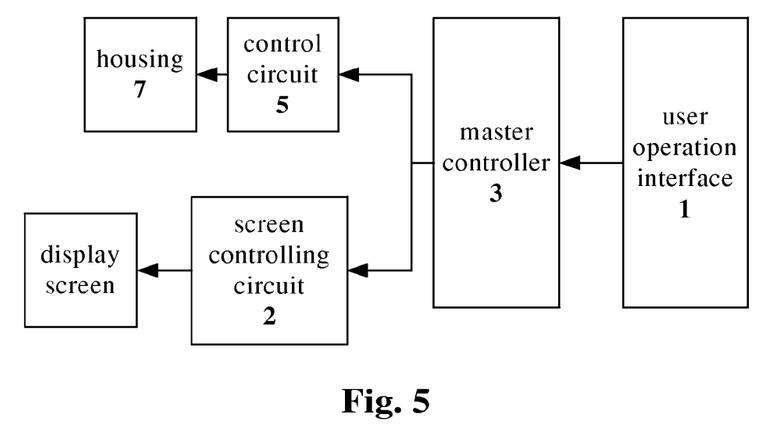
FIG. 5 is a schematic diagram of the structure of an electronic device according to another preferred embodiment of the present invention.

Moreover, in the embodiments of the present invention, the pattern displayed by the housing of the electronic device can be unified with the pattern displayed by the display screen in order to form an integral pattern, or the pattern displayed by the housing of the electronic device and the pattern displayed by the display screen can be independent of each other. Accordingly, as shown in FIG. 5, the electronic device according to the embodiments of the present invention can further comprise: a screen controlling circuit 2. The user operation interface 1 is further configured to instruct the display screen to display a screen pattern according to a selection instruction entered by a user, wherein the housing pattern and the screen pattern may be independent of each other or be combined into a integrated pattern; and the master controller 3 is further configured to separate the screen pattern from the housing pattern, to convert the screen pattern into a second control signaling, and to output the second control signaling; and the screen controlling circuit 2 connected to the master controller 3 is configured to receive the second control signaling and to control the display screen to display the screen pattern according to the second control signaling.

During implementation, multiple different voltages can be provided for each color-variable unit by a Linear DropOut (LDO) which is connected between the power supply and each color-variable unit and is configured to provide multiple voltages to each color-variable unit.

In the embodiments of the present invention, in order to generate more colors, each color-variable unit of the housing can use multiple electrochromic materials simultaneously. Namely, each color-variable unit is actually formed by an overlay of several sub-color-variable units having color characteristics with different voltages. These sub-color-variable units may use a common control-signal line or use independent control-signal lines. In the former situation, the control principle is similar to the scheme used for the single electrochromic material; and in the latter situation, each sub-color-variable unit is an independent control unit, and each sub-color-variable unit uses the scheme for the single electrochromic material, so each sub-color-variable unit needs a control-signal line to control the sub-color-variable unit to change the color.

For further understanding the principle of the control circuit 5 in the embodiments of the present invention, it will be described in detail herein by a detailed embodiment referring to FIG. 3. Supposing that a housing has 32 independent color-variable units, namely, color-variable unit M0, M1, . . . and M31, and each color-variable unit has 4 color changes and needs 4 different voltages to control the 4 color changes correspondingly. If a color-variable unit M1 is to be set as number 2 color, then A4A3A2A1A0=00001 and D1D0=10. In this situation, the chip selection decoder 53 will select a decoder 55 corresponding to the color-variable unit M1, then the decoder 55 is enabled, and the data D1D0 is decoded into 2. Thereafter the switch connecting color-variable unit M1 and voltage line V2 is ON, then the color of the color-variable unit M1 is displayed to be the number 2 color corresponding to the voltage V2. After the coloration is completed, since the electrochromic material has an ability to maintain the color for a time period after power-down, the LDO can be turned off to save power. However, since the current electrochromic material cannot maintain the color long enough after being power-down, so it further needs to set a timer. The timer enables the output of the LDO periodically according to a preset time so as to provide power for each color-variable unit to refresh the color.

As to the screen pattern, it may be only stored as an image and marked as a background image to be applied, and in particular the screen pattern can be displayed on the display screen by using prior art, which will not be described in detail herein.

Preferably, the above electronic device provided by the embodiments of the present invention is a portable electronic device, such as mobile phone, Personal Digital Assistant PDA) or the like.

By using the above electronic device provided by the embodiments of the present invention, the electronic device can change the color of the housing of the electronic device according to users' demands.

A method for changing the color of the housing of an electronic device is further provided according to the embodiments of the present invention, which can be used for changing the color of the housing of the above electronic device provided by the embodiments of the present invention.

Figure 6:
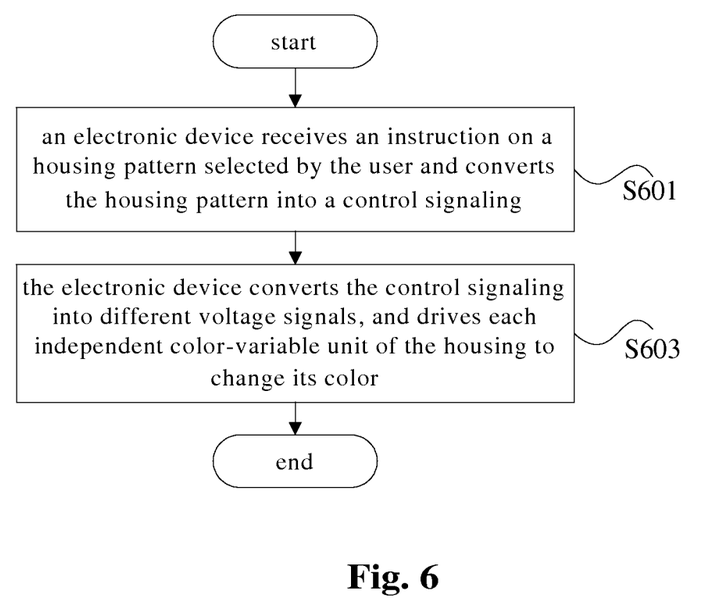
FIG. 6 is a flow chart of a method for changing the color of housing of an electronic device according to the embodiments of the present invention.

FIG. 6 is a flow chart of a method for changing the color of the housing of an electronic device according to the embodiments of the present invention, and as shown in FIG. 6, the method for changing the color of the housing of an electronic device according to the embodiments of the present invention mainly comprises the following steps.

Step S601: the electronic device receives an instruction of a housing pattern selected by the user and converts the housing pattern into a control signaling; and Step S603: the electronic device converts the control signaling into different voltage signals, and drives each independent color-variable unit of the housing to change its color.

After Step S603, in order that each color-variable unit of the housing can maintain its color, a timer needs to be set and started. When the timer arrives a preset time, each independent color-variable unit of the housing is driven again to change its color according to the above voltage signals.

Moreover, before the housing pattern of the electronic device is to change, users can enter a pattern through an interface of the electronic device, and then the electronic device stores this pattern to provide users for subsequent selection.

Figure 7:
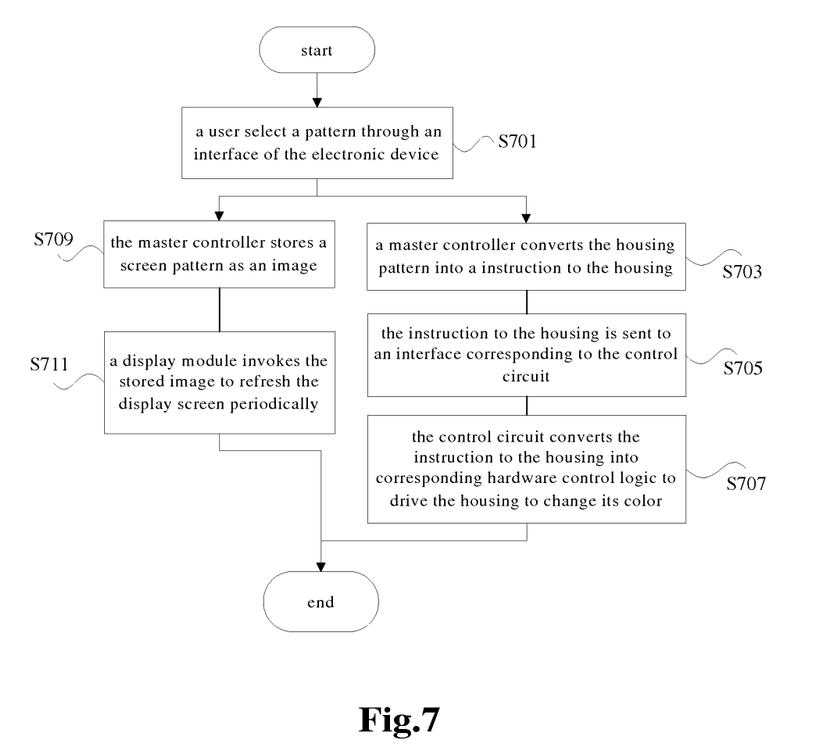
FIG. 7 is a flow chart of a method for changing the color of housing of an electronic device according to a preferred embodiment of the present invention.

FIG. 7 is a flow chart of a method for changing the color of housing of an electronic device according to a preferred embodiment of the present invention, and as shown in FIG. 7, this preferred embodiment mainly comprises the following steps.

Step S701: a user selects a pattern through an interface of the electronic device;

Step S703: a master controller converts the housing pattern into an instruction to the housing;

Step S705: the instruction to the housing is sent to an interface corresponding to the control circuit;

Step S707: the control circuit converts the instruction to the housing into corresponding hardware control logic to drive the housing to change its color;

Step S709: the master controller stores a screen pattern as an image; and

Step S711: a display module invokes the stored image to refresh the display screen periodically.

The above method provided according to the embodiments of the present invention can be performed in various driving manners, which will be described in detail by the following particular embodiments.

Embodiment I

In this embodiment, a housing can be used to prompt certain events by displaying different patterns or different colors. Users can define different colors and variation modes to indicate occurrence of asynchronous events such as an incoming call, an incoming short message, an alarm, or power insufficiency, etc. For example, when an alarm rings, the housing can sequentially display colors such as yellow, green, blue, etc.; and when power is insufficient, the refresh program will be closed, and the color of the housing will fade, indicating that the power is insufficient. Moreover, when a similar driving event happens, the master controller will be driven to generate corresponding control instructions in order that the housing displays corresponding patterns.

Embodiment II

In this embodiment, individuality signatures of users can be shown on the housing. In particular, users can use the housing to display their favorite sentences on the housing of the electronic device. In particular, there are two methods of implementation; one is that users can set the text, font, color, and location to be displayed on a theme setting interface, and the other is that users can directly write with a touch pen. A setting module will record the color-variable unit operated by users and corresponding color information, and output a final coloration scheme after combining with default settings. Then, users can select the pattern, and the coloration scheme is displayed on the housing by performing the above steps S601 to S603.

Embodiment III

In this embodiment, the variation of housing pattern can be driven by time, and the housing pattern differs as time differs. In this embodiment, the housing pattern can change over one day or one year. For example, the housing pattern is red in the morning, blue in the noon, and yellow in the afternoon. If there is a special anniversary day, it can also be displayed on the housing of the mobile phone. For example, the word "happy new year" can be displayed on the housing of the mobile phone on New Year's Day. When the time of changing a pattern, which is set by users, arrives, the master controller will be driven to generate a control signaling corresponding to the pattern selected by the user for this time period, so as to drive each color-variable unit of the housing to change its color correspondingly.

A computer-readable medium is further provided according to the embodiments of the present invention, in which computer-executable instructions are stored. When these computer-executable instructions are executed by a computer or a processor, the computer or the processor may perform the steps as shown in FIGS. 6 and 7.

The above-mentioned technical scheme provided according to the embodiments of the present invention may be used for all electronic devices, and especially suitable for portable entertainment devices, such as mobile phone, PDA or the like. In addition, the above-mentioned implementing schematic diagram of the control circuit in the embodiments of the present invention merely only provides one of possible implementation, and person skilled in the art can change or improve in detail based on idea of the present invention, which is not departure from the basis idea of the present invention.

As described above, by the technical scheme provided by the embodiments of the present invention, the housing of electronic devices are consisted of color-variable units made of electrochromic materials with capacity of memory, and change the color itself through control circuit controlling each color-variable unit. Thereby it can be possible that the housing pattern of electronic devices is changed by following users' demands, and it improves users' experience.

Above description is only to illustrate the preferred embodiments but not to limit the present invention. Various alterations and changes to the present invention are apparent to those skilled in the art. The scope defined in claims shall comprise any modification, equivalent substitution and improvement within the spirit and principle of the present invention.

What is claimed is:

1. An electronic device, comprising a power supply, a display screen, and a housing, wherein
the housing is configured to have multiple independent color-variable units, and each color-variable unit, which is connected to the power supply, is made of electrochromic materials with capacity of memory respectively; and
the electronic device further comprises:
a user operation interface, configured to receive an instruction inputted by a user for selecting a housing pattern;
a master controller, which is connected to the user operation interface, configured to convert the selected housing pattern into a first control signaling, and then to output the first control signaling; and
a control circuit, which is connected to the master controller, configured to receive the first control signaling, and to convert the first control signaling into different voltage signals to control the each color-variable unit of the housing to change the color;
wherein the control circuit comprises:
a circuit for interface and decoding, configured to analyze the first control signaling from the master controller and to obtain an address and corresponding color information of the each color-variable unit;
a chip selection decoder, configured to output the color information of the each color-variable unit according to the address of the each color-variable unit; and
a decoder, which is connected to the each color-variable unit correspondingly, configured to decode the color information from the chip selection decoder and to convert the color information into the voltage signals, then to control an input voltage of the connected corresponding color-variable unit according to the voltage signals in order that the connected corresponding color-variable unit displays a color corresponding to the color information.

2. The electronic device according to claim 1, wherein the control circuit is connected to the master controller through a serial interface.

3. The electronic device according to claim 2, wherein the each color-variable unit of the housing is made of at least two types of electrochromic materials.

4. The electronic device according to claim 1, wherein the electronic device further comprises:
a timer, configured to control the master controller to output the first control signaling periodically according to a preset time.

5. The electronic device according to claim 4, wherein the each color-variable unit of the housing is made of at least two types of electrochromic materials.

6. The electronic device according to claim 1, wherein
the user operation interface is further configured to instruct the display screen to display a screen pattern according to the instruction inputted by the user, wherein the housing pattern and the screen pattern are independent of each other, or are combined as a complete pattern; and
the master controller is further configured to separate the screen pattern from the housing pattern, to convert the screen pattern into a second control signaling, and then to output the second control signaling; and
the electronic device further comprises:
a screen controlling circuit, which is connected to the master controller, configured to receive the second control signaling, and then to control the display screen to display the screen pattern according to the second control signaling.

7. The electronic device according to claim 6, wherein the each color-variable unit of the housing is made of at least two types of electrochromic materials.

8. The electronic device according to claim 1, wherein the electronic device further comprises:
a low dropout linear regulator, which is connected between the power supply and the each color-variable unit, configured to input multiple voltages into the each color-variable unit.

9. The electronic device according to claim 8, wherein the each color-variable unit of the housing is made of at least two types of electrochromic materials.

10. The electronic device according to claim 1, wherein the each color-variable unit of the housing is made of at least two types of electrochromic materials.

11. A method for changing housing colors of an electronic device, wherein the housing has multiple independent color-variable units, and each color-variable unit is made of electrochromic materials with capacity of memory respectively, the method comprises:
the electronic device receiving an instruction of a housing pattern selected by a user and converting the housing pattern into a control signaling; and
the electronic device converting the control signaling into different voltage signals and driving the each independent color-variable unit of the housing to change the color;
wherein the electronic device converting the control signaling into different voltage signals and driving the each independent color-variable unit of the housing to change the color comprises:
a circuit for interface and decoding of the electronic device analyzing the control signaling from a master controller of the electronic device and obtaining an address and corresponding color information of the each color-variable unit;
a chip selection decoder of the electronic device outputting the color information of the each color-variable unit according to the address of the each color-variable unit; and
a decoder of the electronic device, which is connected to the each color-variable unit correspondingly, decoding the color information from the chip selection decoder and converting the color information into the voltage signals, then controlling an input voltage of the connected corresponding color-variable unit according to the voltage signals in order that the connected corresponding color-variable unit displays a color corresponding to the color information.

12. The method according to claim 11, wherein after driving the each independent color-variable unit of the housing to change the color, the method further comprises:
setting and starting a timer, and then when the timer arrives a preset duration, driving the each independent color-variable unit of the housing to change the color again according to the voltage signals.

13. The method according to claim 11, wherein the method further comprises:
the electronic device receiving the pattern entered by users through an interface with the electronic device and storing the pattern to provide the user to select.

* * * * *